United States Patent [19]

Constable et al.

[11] 4,178,610
[45] Dec. 11, 1979

[54] CLAMP CIRCUIT FOR RGB OUTPUT STAGES

[75] Inventors: Douglas W. Constable; John D. Lovely, both of Batavia, N.Y.

[73] Assignee: GTE Sylvania Incorporated, Stamford, Conn.

[21] Appl. No.: 878,695

[22] Filed: Feb. 17, 1978

[51] Int. Cl.² ............................................. H04N 5/16
[52] U.S. Cl. ...................................................... 358/34
[58] Field of Search ............................... 358/29, 30, 34

[56] References Cited

U.S. PATENT DOCUMENTS

| | | | |
|---|---|---|---|
| 2,901,534 | 8/1959 | Oakley | 358/34 X |
| 2,935,556 | 5/1960 | Barco | 358/34 X |
| 3,535,436 | 10/1970 | Limberg | 358/34 |
| 3,729,577 | 4/1973 | Buell | 358/34 |
| 3,736,370 | 5/1973 | Thielking | 358/34 |

Primary Examiner—Robert L. Griffin
Assistant Examiner—Aristotelis M. Psitos
Attorney, Agent, or Firm—John A. Odozynski

[57] ABSTRACT

A circuit utilizing a single clamp, and therefore requiring only a single bias supply, to DC clamp the inputs of the three chrominance amplifiers is shown. The clamp employs a switch that is connected to the bias supply and coupled by separate diodes to the inputs of the chrominance amplifiers. The switch and diodes are conductive only during the horizontal retrace period. As a result, during the retrace period, the amplifier inputs are clamped to a DC value determined by the bias supply; during the trace, or information-bearing period the inputs are isolated from the supply, as well as from each other.

9 Claims, 2 Drawing Figures

CLAMP CIRCUIT FOR RGB OUTPUT STAGES

FIELD OF THE INVENTION

This invention relates generally to chrominance processing circuitry for television receivers and particularly to circuitry for AC coupling the demodulated chrominance signals to the chrominance amplifiers and for re-inserting the DC component during the horizontal synchronizing period.

BACKGROUND OF THE INVENTION

In a typical color television receiver, the (R−Y), (B−Y) and (G−Y) color difference signals are DC coupled from the chrominance demodulator to the inputs of the chrominance amplifiers. However, because of the high gain of the chrominance amplifiers, relatively minor differentials in the DC voltages at the amplifier inputs result in significant differentials in the amplifiers DC outputs. These differentials are manifest as undesirable changes in the background color of the reproduced picture. In addition, any coupling or pickup of the chrominance reference signal into the demodulator will result in a DC offset voltage which will be different in magnitude and direction at each of the demodulators color difference output terminals. Furthermore, the differential DC voltages at the demodulator outputs tend to vary as the ambient temperature of the demodulator circuitry varies. Because the ambient temperature of the television receiver can be expected to increase according to the length of time the receiver has been operating, DC coupled chrominance amplifiers tend to exhibit time-varying color temperature. The above effects demand that the DC differentials at the demodulator outputs be maintained within rather stringent limits. This can be accomplished by AC coupling the color difference signals and re-inserting the DC component during the horizontal synchronizing period. Because the color difference signals can be either positive or negative values, the DC restoration requires the use of a keyed clamping circuit. However, prior art circuits required a clamp for each of the three chrominance amplifiers, thereby appreciably adding to the cost and detracting from the reliability of the receiver.

OBJECTS OF THE INVENTION

It is an object of this invention to effect AC coupling of the chrominance signal outputs of the chrominance demodulator to the inputs of the red, green and blue output stages, that is, chrominance amplifiers.

It is a further object of this invention to re-insert the DC component of the chrominance signal during the horizontal synchronizing period.

It is a further object of this invention to provide an effective and inexpensive DC clamping circuit for the chrominance output stages.

SUMMARY OF THE INVENTION

The above and further objects, advantages and capabilities are provided in a television receiver that AC couples the demodulated chrominance signals to the input of the respective chrominance amplifiers. The receiver includes a clamp circuit comprising a switch having at least first and second electrodes. In one embodiment the first electrode of the switch is connected to the cathodes of diodes which, in turn, have anodes connected to the inputs of the chrominance amplifiers. The second electrode of the switch is connected to a bias supply and a third electrode is coupled to a source of horizontal flyback pulses so that the switch is closed-circuited during the horizontal flyback period and the DC voltages at the inputs of the chrominance amplifiers are clamped to a value determined by the value of the bias supply.

In an alternate embodiment of the invention, the switch has a first electrode coupled both to the anodes of the diodes and to a source of keying pulses. The cathodes of the diodes are connected to the inputs of the chrominance amplifiers.

DESCRIPTION OF THE PREFERRED EMBODIMENT

For a better understanding of the present invention, together wiith other and further objects, advantages and capabilities thereof, reference is made to the following disclosure in conjunction with the accompanying drawings.

Figure 1:
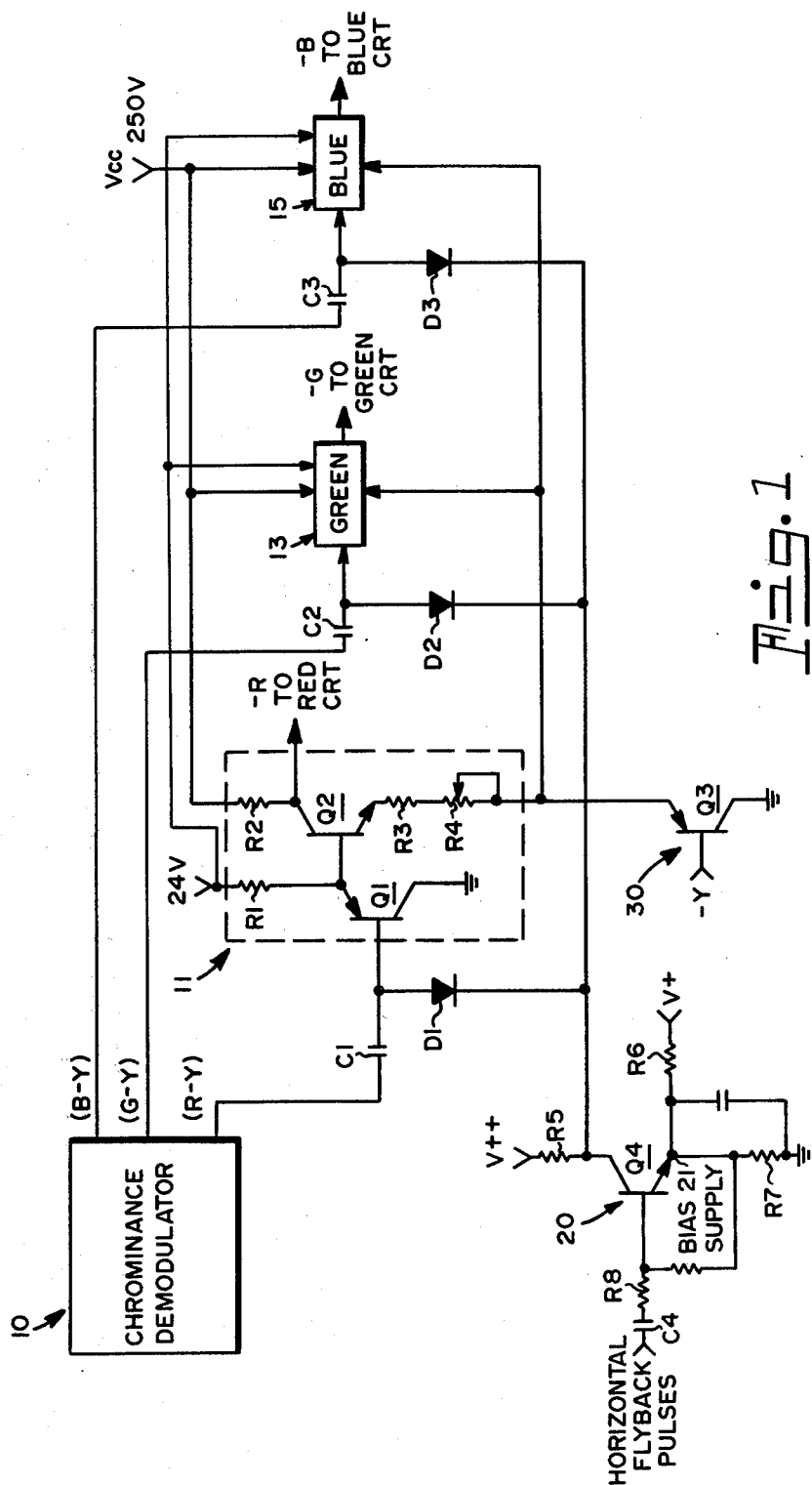
FIG. 1 is a schematic diagram of the subject invention. Conventional co-operating and repetitive identical circuitry is shown in block form.

As illustrated in FIG. 1, a chrominance demodulator 10 provides an (R−Y) signal to a RED amplifier 11, a (G−Y) signal to a GREEN amplifier 13, and a (B−Y) signal to a BLUE amplifier 15. (As conventionally understood, the symbol "Y" refers to the luminance component of the composite video signal and the terms (R−Y), (G−Y), and (B−Y) refer to signals representing the algebraic difference between the respective red, green, or blue chrominance signal components and the luminance signal.) Because each of the three amplifiers may be identical, only the RED amplifier is shown in detail and the BLUE and GREEN amplifiers are depicted in block form.

The outputs of the demodulator are AC coupled through associated capacitors C1, C2 and C3 to the base of a PNP transistor Q1 in an emitter-follower configuration. Q1 has a collector connected to ground and an emitter connected to the base of an NPN output transistor Q2 and coupled through a resistor R1 to a 24-volt DC supply. Q2 has a collector coupled through a resistor R2 to a 250-volt supply and an emitter coupled through a fixed resistor R3 and a variable resistor R4 to a source of luminance signals 30 in the form of a transistor Q3.

As is well understood, the differential action between the (R−Y) signal at the base of Q2 and the −Y signal provided by Q3 and coupled to the emitter of Q2 through R3 and R4 result in the appearance of the RED (or R) video signal at the collector of Q2. The RED output of amplifier 11, as well as the GREEN output of amplifier 13 and the BLUE output of amplifier 15, are coupled to the respective RED, GREEN, and BLUE cathodes of the television receiver's cathode ray tube (not shown).

In order to assure the desired DC voltage at the input of each chrominance amplifier, and thereby the desired DC voltage at the amplifiers' outputs, the input of each amplifier is coupled to a clamping circuit 20. The clamping circuit comprises a switch, in the form of a transistor Q4, having a first electrode, that is, collector, connected to the cathodes of diodes D1, D2 and D3.

The diodes have anodes separately coupled to the inputs of the RED, GREEN and BLUE chrominance amplifiers respectively. Q4 has a second electrode, that is, emitter, coupled to a bias supply 21. The bias supply is derived from the voltage division of the V+ supply effected by R6 and R7, R6 being connected between V+ and the emitter of Q4 and R7 being connected between the emitter of Q4 and ground. A possible value of V+ is 11.2 volts and the resulting bias supply can be 5.0 volts.

Q4 has a third electrode, that is, a base, AC coupled through a capacitor C4 and a resistor R8 to a source of positive-going horizontal flyback pulses. During the active or information-bearing period of each horizontal line, Q4 is effectively cut-off or open-circuited. Each of the diodes D1, D2 and D3 is back-biased by virtue of being connected through the resistor R5 to V++ supply. V++ has a value, for example, 24 volts, that is greater than the value of the bias supply plus the peak amplitude of the chromminance demodulator output signals. Consequently, the inputs of the chrominance amplifiers are isolated from each other as well as from the bias supply and are allowed to follow the respective AC signal outputs of the chrominance demodulator. During the retrace portion of each horizontal line, the horizontal flyback pulses provide base current for Q4 and Q4 becomes effectively saturated or closed-circuited. Accordingly, the bias supply is coupled through the low impedance of Q4 and the now forward-biased diodes D1, D2 and D3 to C1, C2 and C3 and to the inputs of the chrominance amplifiers, that is, to the base of Q1. Because the demodulator output impedance is low and the input impedance of Q1 is high, the DC input of each of the chrominance amplifiers is clamped to a voltage determined by the bias supply. The relatively high input impedance provided by the emitter-follower configuration of Q1 assures that the DC input will remain substantially constant during the active portion of the horizontal line. In addition, the complementary nature of Q1 and Q2 (PNP, NPN) provides tracking and temperature compensation of the voltage drops of their respective base-to-emitter junctions and, as a result, improved stability of the DC output of the chrominance amplifiers. It should be noted that in configurations not concerned with such stability or wherein the input impedance of Q2 alone is sufficiently high to assure adequate DC clamping, it may be possible to eliminate Q1 altogether and couple the outputs of the chrominance demodulator through C1, C2 or C3 directly to the base of Q2. However, it is expected that in most circuits the gain required of the chrominance amplifiers will be high and, because the gain of these amplifiers is largely determined by the ratio of R2 to the series combination of R3 and R4, the input impedance reflected by Q2 will not be great enough to permit effective DC clamping at that point.

Figure 2:
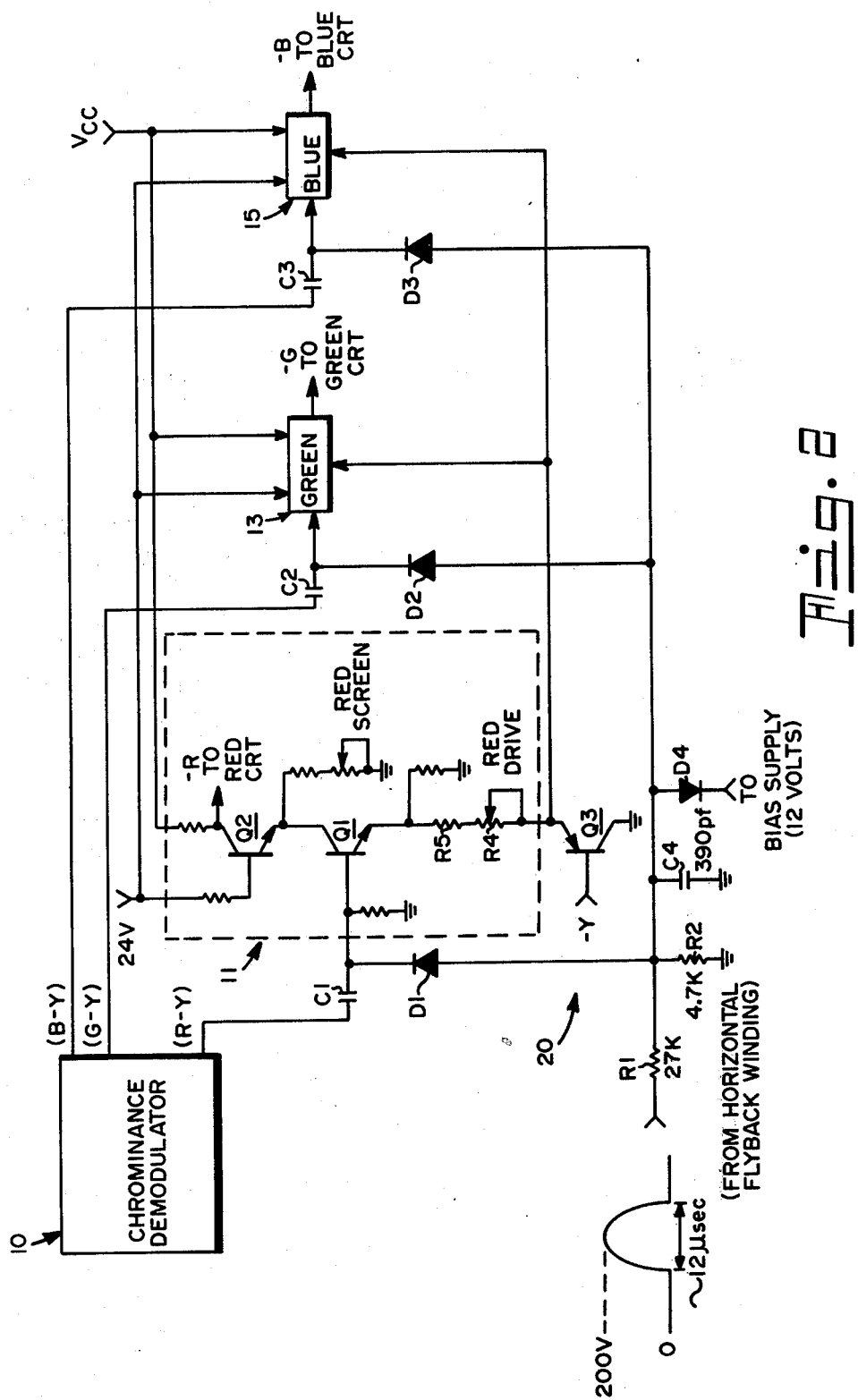
FIG. 2 is a schematic diagram of an alternate embodiment of the invention.

An alternate embodiment of the subject invention is shown in FIG. 2. In this embodiment each of the chrominance amplifiers comprises NPN transistors Q1 and Q2 in a cascode configuration, that is, common-emitter input and common-base output. The particular advantages of the configuration are fully described in U.S. patent application Ser. No. 716,124, "Apparatus for Adjusting the Operating Conditions of a Cathode Ray Tube", filed Aug. 20, 1976 and now abandoned.

The clamping circuit 20 comprises clamping diodes D1, D2 and D3 having cathodes respectively connected to C1, C2 and C3 at the base of Q1, that is, at the inputs of the chrominance amplifiers. The anodes of D1, D2 and D3 are connected to a source of keying pulses at the junction of resistors R1 and R2 and to a switch in the form of a diode D4. Diodes D1–D4 can be small signal, high speed silcon types. R1 is connected to a positive-going, approximately 12 microsecond (μsec), 200-volt pulse provided by the horizontal flyback winding. R1 is also connected to R2, the parallel combination of C4 and which is in turn connected to circuit ground. The anode of D4 is coupled to the keying pulse and its cathode is coupled to a 12 volt bias supply. (The value of the bias supply is not critical and is chosen to accommodate the requirements of the chrominance amplifiers). R2 reverse biases D1, D2, D3 and D4 during trace time. During retrace time a 200 V flyback pulse, divided and delayed by R1, R2 and C4, turns on D4. With D4 conducting, diodes D1, D2 and D3 are connected to the 12 V bias supply through D4. D1, D2 and D3 conduct during retrace time and clamp the bases of the cascode stages (Q1, etc.) to the 12 V bias supply. During clamping time, the forward voltage drops of D1, D2 and D3 are cancelled by the forward voltage drop of D4, providing temperature tracking of the clamp voltage. In addition to dividing and delaying the flyback pulse, R1, R2, and C4 operate in conjunction with D4 and the bias supply so as to narrow the keying pulse width, that is, the clamping period, to something less than the 12 μsec width of the flyback pulse. Assuming that in the absence of D4 and the bias supply the divided amplitude of the keying pulse would be approximately $$\frac{200V\ (R2)}{(R1 + R2)}, \text{ or } \frac{200\text{ volts}}{K},$$

then for a bias supply of 12 volts, it can be shown that the clamping period will be approximately $$12\mu\ \sec \times \left[1 - \frac{2\sin^{-1}}{\pi}\ \frac{K\ 12\text{ volts}}{200\text{ volts}}\right]$$

As is already observed, operation of the alternate embodiment is substantially analagous to that of the embodiment depicted in FIG. 1. The noteworthy differences are that transistor Q4 has been replaced by a diode D4, the connections of diodes D1, D2 and D3 have been reversed, and the keying pulse is derived directly from the positive-going flyback pulse, as opposed to the negative-going signal at the collector of Q4.

In summary, the subject invention provides an efficient and inexpensive circuit for clamping the DC inputs of the chrominance amplifiers. A single clamp serves all of the chrominance amplifiers, thereby minimizing cost and substantially reducing differences in the clamping voltages that occur when each amplifier requires a separate clamp circuit.

While there has been shown and described what is at present considered the preferred embodiment of the invention it will be obvious to those skilled in the art that various changes and modifications may be made therein without departing from the invention as defined by the appended claims.

What is claimed is:

1. In a television receiver having a plurality of signals AC coupled from the output of a chrominance demodulator to the inputs of respective chrominance amplifiers, a clamp circuit comprising:

voltage dividing means coupled to a source of pulses characterized by an amplitude, A, and a pulse-width, T, for dividing said pulses by a factor, K;

a plurality of clamping diodes having common ends coupled to the output of the dividing means and other ends separately connected to respective inputs of the chrominance amplifiers and capacitively coupled to associated signal outputs of the chromminance demodulator;

diode means having one end coupled to the output of the dividing means; and a bias supply characterized by an amplitude B and coupled to another end of the diode means whereby a clamping period is established, said clamping period having a duration less than T by a factor directly related to K and inversely related to the ratio of A to B.

2. A clamp circuit as defined in claim 1 wherein the dividing means comprises:

a first resistance coupled between a source of flyback pulses and the common ends of the clamping diodes, and a second resistance coupled between the common ends of the clamping diodes and a reference potential.

3. A clamp circuit as defined in either claim 1 or claim 2 wherein the clamping diodes have anodes coupled to the output of the dividing means and cathodes separately connected to respective inputs of the chrominance amplifiers.

4. A clamp circuit as defined in claim 3 wherein the diode means has an anode coupled to the anodes of the clamping diodes and a cathode coupled to the bias supply so that the clamping diodes and diode means are rendered conductive during the clamping period.

5. A clamp circuit as defined in claim 1 wherein the dividing means is coupled to a source of horizontal flyback pulses so that the clamping period is less than the duration, T, of the flyback period by a factor approximately equal to:

$$T \times \left[ 2 \frac{\sin^{-1}}{\pi} \left( \frac{KB}{A} \right) \right].$$

6. In a color television receiver having a first chrominance demodulator output coupled through a first capacitor to the input of the RED chrominance amplifier, a second demodulator output coupled through a second capacitor to the input of the GREEN chrominance amplifier, and a third demodulator output coupled through a third capacitor to the input of the BLUE chrominance amplifier, a clamp circuit comprising:

voltage dividing means having an input coupled to a source of flyback pulses characterized by a period T and an amplitude A, said means for dividing those pulses by a factor K;

first, second and third clamping diodes, each separately connected at one end to the inputs of the RED, GREEN and BLUE amplifiers respectively and commonly connected to the other end to each other and to an output of the voltage dividing means;

a bias supply characterized by an amplitude B;

a switch coupled between the output of the dividing means and the bias supply so that the switch is rendered conductive during the flyback period for a length of time that is less than T by a factor approximately equal to:

$$T \times \left[ 2 \frac{\sin^{-1}}{\pi} \left( \frac{KB}{A} \right) \right].$$

7. A clamp circuit as defined in claim 6 wherein the dividing means comprises:

a first resistor coupled to the horizontal flyback winding, and a second resistor coupled between a junction formed by the first resistor and by the commonly connected ends of the clamping diodes and a reference potential.

8. A clamp circuit as defined in claim 7 wherein the switch comprises a diode having an anode connected to commonly connected anodes of the clamping diodes and a cathode coupled to the bias supply.

9. A clamp circuit as defined in claim 8 further comprising a capacitance coupled between the output of the voltage dividing means and the reference potential for delaying the pulses at the output of the dividing means.

* * * * *

UNITED STATES PATENT AND TRADEMARK OFFICE
CERTIFICATE OF CORRECTION

PATENT NO. : 4,178,610

DATED : December 11, 1979

INVENTOR(S) : Douglas W. Constable and John D. Lovely

It is certified that error appears in the above-identified patent and that said Letters Patent are hereby corrected as shown below:

Col. 6, Line 21: "connected to" should read --- connected at ---

Signed and Sealed this

Twenty-fifth Day of March 1980

[SEAL]

Attest:

SIDNEY A. DIAMOND

Attesting Officer

Commissioner of Patents and Trademarks